(12) United States Patent
Bai

(10) Patent No.: US 8,955,196 B2
(45) Date of Patent: Feb. 17, 2015

(54) PIVOTING MECHANISM AND RELATED ELECTRONIC DEVICE

(71) Applicant: Wistron Corporation, New Taipei (TW)

(72) Inventor: Shun-De Bai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/076,275

(22) Filed: Nov. 11, 2013

(65) Prior Publication Data

US 2014/0345085 A1   Nov. 27, 2014

(30) Foreign Application Priority Data

May 22, 2013   (TW) .............................. 102118124 A

(51) Int. Cl.
*E05D 3/10* (2006.01)
*E05D 7/04* (2006.01)

(52) U.S. Cl.
CPC .................................... *E05D 7/0415* (2013.01)
USPC ................... 16/367; 361/679.07; 361/679.28; 439/31; 439/165

(58) Field of Classification Search
USPC .................. 16/366, 367; 361/679.06, 679.07, 361/679.27, 679.28; 248/921; 439/31, 165
See application file for complete search history.

(56) References Cited

U.S. PATENT DOCUMENTS

| 7,129,931 B2 * | 10/2006 | Pappas .......................... 345/168 |
| 7,133,280 B2 * | 11/2006 | Love ......................... 361/679.07 |
| 7,380,313 B2 * | 6/2008 | Akiyama et al. ................ 16/367 |
| 7,551,431 B2 * | 6/2009 | Nakajima ................ 361/679.06 |
| 8,250,713 B2 * | 8/2012 | Lin ................................. 16/367 |
| 8,300,391 B2 * | 10/2012 | Hu ........................... 361/679.07 |
| 2003/0167601 A1 * | 9/2003 | Chen ............................... 16/367 |
| 2005/0198780 A1 * | 9/2005 | Liu et al. ......................... 16/367 |
| 2006/0133020 A1 * | 6/2006 | Huang et al. ................... 361/683 |

* cited by examiner

Primary Examiner — William Miller
(74) Attorney, Agent, or Firm — Winston Hsu; Scott Margo

(57) ABSTRACT

A pivoting mechanism includes a first driving component, a second driving component and a pivot shaft. The first driving component includes a first pivoting portion and a first connecting portion, the first connecting portion is disposed on the first pivoting portion. The second driving component includes a second pivoting portion, a second connecting portion, a positioning portion, a rotary unit and a rotary shaft. The second connecting portion is disposed on the second pivoting portion. The positioning portion is disposed on the second connecting portion. The positioning portion includes a slot structure, and the rotary unit is disposed inside the slot structure. The rotary shaft passes through the rotary unit, and two ends of the rotary shaft respectively pivot to inner walls of the slot structure. The pivot shaft is disposed between the first pivoting portion and the second pivoting portion.

20 Claims, 7 Drawing Sheets

PIVOTING MECHANISM AND RELATED ELECTRONIC DEVICE

BACKGROUND OF THE INVENTION

1. Field of the Invention

The present invention relates to a pivoting mechanism and a related electronic device, and more particularly, to a pivoting mechanism and a related electronic device capable of preventing the body from scrape and having the thin-typed appearance.

2. Description of the Prior Art

With the advanced technology, the display of the electronic device trends a large-scaled for comfortable entertainment enjoyment. The display is disposed on the supporter via a pivot mechanism. The user can rotate the display according to a position of the electronic device, to adjust a pivot angle of the display relative to the supporter for a preferred view angle. The pivot mechanism utilizes friction to generate force for supporting the display, so as to fix the pivot angle of the display relative to the supporter. However, the display of the conventional electronic device has huge volume, and a weight of the display is heavy accordingly. The display is easy to scrap a casing of the supporter during rotation. Thus, design of a pivot mechanism capable of preventing the supporter from hurt and having thin-typed appearance is an important issue in the mechanical industry.

SUMMARY OF THE INVENTION

The present invention provides a pivoting mechanism and a related electronic device capable of preventing the body from scrape and having the thin-typed appearance for solving above drawbacks.

According to the claimed invention, a pivoting mechanism includes a first driving component, a second driving component and a pivot shaft. The first driving component includes a first pivoting portion and a first connecting portion, the first connecting portion is disposed on the first pivoting portion. The second driving component includes a second pivoting portion, a second connecting portion, a positioning portion, a rotary unit and a rotary shaft. The second connecting portion is disposed on the second pivoting portion. The positioning portion is disposed on a position of the second connecting portion different from the second pivoting portion. The positioning portion includes a slot structure. The rotary unit is disposed inside the slot structure. The rotary shaft passes through the rotary unit. Two ends of the rotary shaft respectively pivot to two opposite inner walls of the slot structure. The pivot shaft is disposed between the first pivoting portion and the second pivoting portion.

According to the claimed invention, a side of the rotary unit protrudes from the slot structure.

According to the claimed invention, a height of the first pivoting portion is substantially greater than a height of the first connecting portion, and the first connecting portion is disposed on an end of a lateral surface of the first pivoting portion spaced from the second driving component.

According to the claimed invention, a height of the second pivoting portion is substantially greater than a height of the second connecting portion, and the second connecting portion is disposed on an end of a lateral surface of the second pivoting portion spaced from the first driving component.

According to the claimed invention, a height of the positioning portion is substantially smaller than a distance between the first driving component and the second driving component.

According to the claimed invention, the pivot shaft is a hollow structure for being passed through by a transmission cable.

According to the claimed invention, the second driving component further includes a positioning unit disposed on an outer surface of the rotary unit to guide the rotary unit to move.

According to the claimed invention, an electronic device includes a first body, a second body and a pivot module. The second body is rotatably disposed on the first body. The pivot module is disposed between the first body and the second body. The pivot module includes a base, a cover and a pivoting mechanism. The cover is disposed on the base and pivoting to the first body. The pivoting mechanism is disposed between the base and the second body. The pivoting mechanism includes a first driving component, a second driving component and a pivot shaft. The first driving component includes a first pivoting portion and a first connecting portion, the first connecting portion is disposed on the first pivoting portion. The second driving component includes a second pivoting portion, a second connecting portion, a positioning portion, a rotary unit and a rotary shaft. The second connecting portion is disposed on the second pivoting portion. The positioning portion is disposed on a position of the second connecting portion different from the second pivoting portion. The positioning portion includes a slot structure. The rotary unit is disposed inside the slot structure. The rotary shaft passes through the rotary unit. Two ends of the rotary shaft respectively pivot to two opposite inner walls of the slot structure. The pivot shaft is disposed between the first pivoting portion and the second pivoting portion.

According to the claimed invention, the first body includes a constraint slot for accommodating the positioning unit. A structural direction of the constraint slot corresponds to a movement track of the rotary unit.

According to the claimed invention, the first body includes a positioning structure. A plurality of constraining structures is disposed on an inner lateral wall of the positioning structure for contacting against the rotary unit. An arrangement of the plurality of constraining structures corresponds to a movement track of the rotary unit.

According to the claimed invention, the constraining structure is a protrusion.

According to the claimed invention, the first connecting portion and the second connecting portion are respectively fixed on the base and the second body by a plurality of fixing components.

According to the claimed invention, the pivot module further includes a door disposed on the base and located by a side of the pivoting mechanism.

According to the claimed invention, the second body rotates relative to the first body at a first direction by the cover. The second body further rotates relative to the base at a second direction different from the first direction by the pivoting mechanism.

The present invention disposes the rotary unit on the pivoting mechanism, the rotary unit movably contacts against the body when the operation mode of the electronic device is switched, so as to provide the stable supporting force and prevent the bodies from collision during the rotation. Therefore, the present invention provides the pivoting mechanism with simple structure and preferable aesthetic appearance, which conforms to demand of the thin-typed electronic device in the consumer market.

These and other objectives of the present invention will no doubt become obvious to those of ordinary skill in the art after

DETAILED DESCRIPTION

Figure 1:
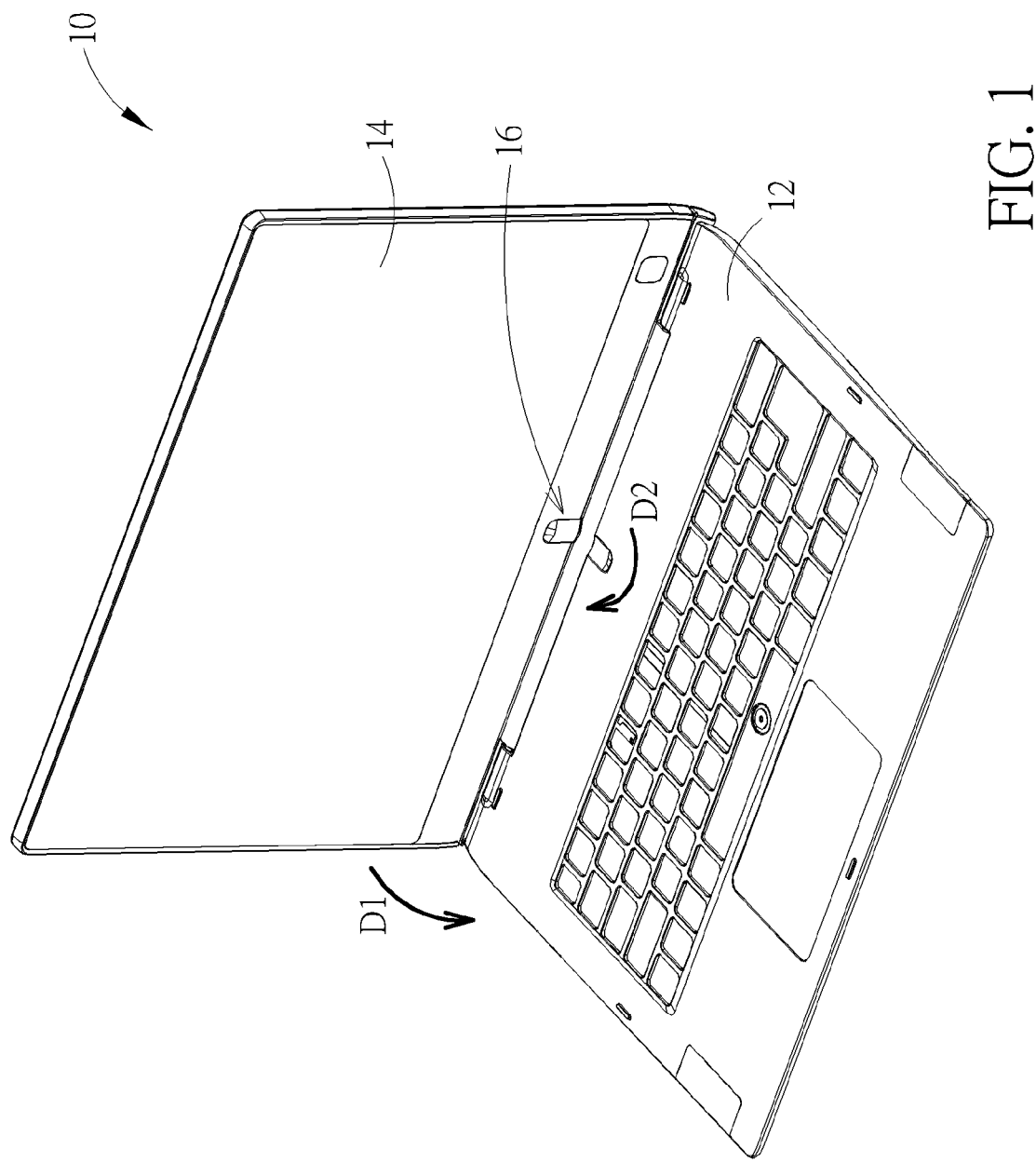
FIG. 1 is a diagram of an electronic device according to an embodiment of the present invention.

Please refer to FIG. 1. FIG. 1 is a diagram of an electronic device 10 according to an embodiment of the present invention. The electronic device 10 includes a first body 12, a second body 14 and a pivot module 16. The first body 12 can be a host, the second body 14 can be a screen rotatably disposed on the first body 12. The pivot module 16 has a multiple pivoting function and is disposed between the first body 12 and the second body 14. The second body 14 can rotate relative to the first body 12 at a first direction D1, which means that the electronic device 10 can be utilized at the notebook mode. The second body 14 further can rotate relative to the first body 12 at a second direction D2 different from the first direction D1, and the electronic device 10 can be switched from the notebook mode to the tablet computer mode.

Figure 2:
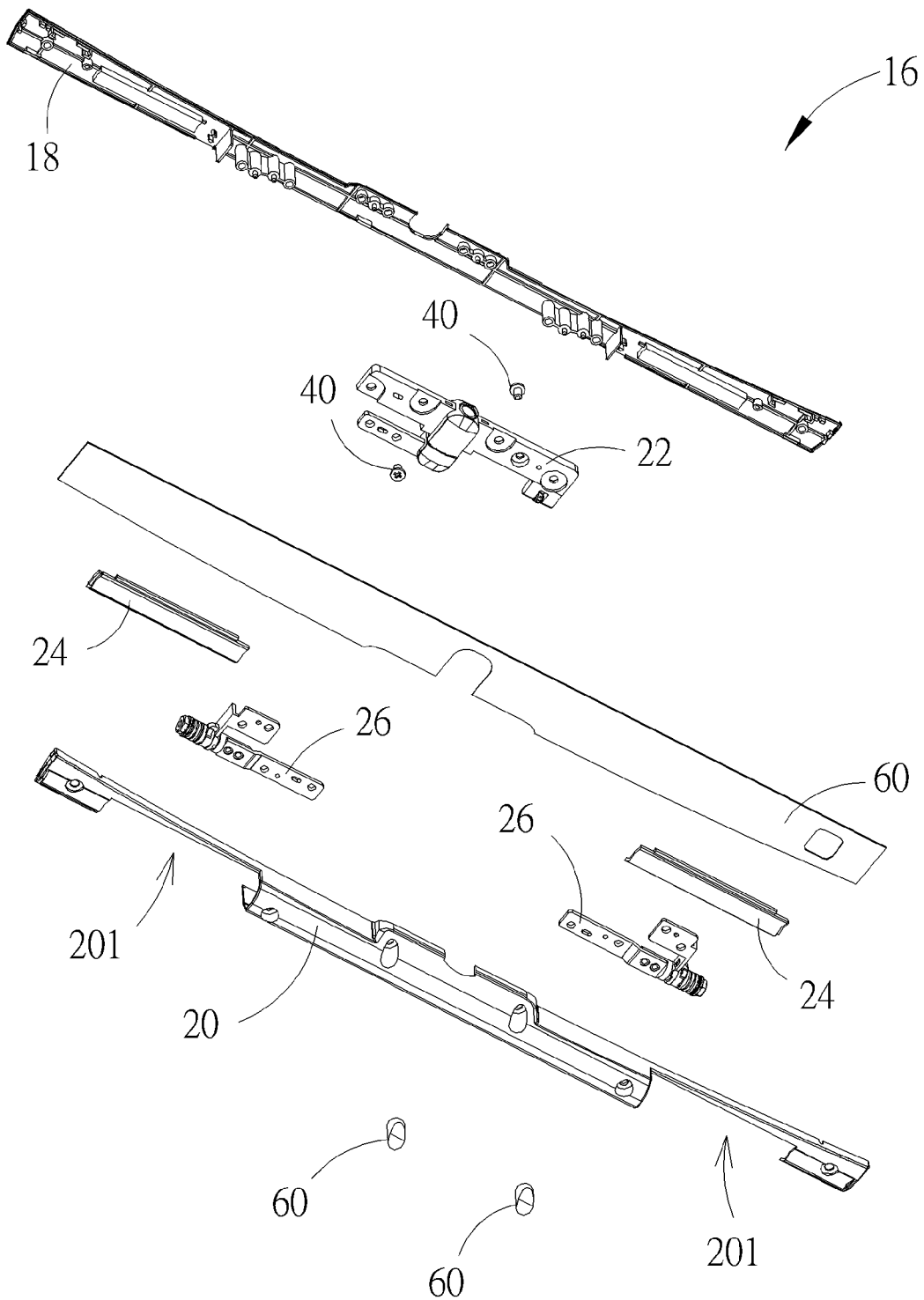
FIG. 2 is an exploded diagram of a pivot module according to the embodiment of the present invention.

Please refer to FIG. 1 and FIG. 2. FIG. 2 is an exploded diagram of the pivot module 16 according to the embodiment of the present invention. The pivot module 16 includes a base 18, a cover 20, a pivoting mechanism 22 and two doors 24. The pivoting mechanism 22 is disposed on the base 18 and the second body 14, and the second body 14 can rotate relative to the base 18 and the first body 12 by the pivoting mechanism 22. The doors 24 are disposed on the base 18, and respectively located at two sides of the pivoting mechanism 22. A plurality of holes 201 is formed on the cover 20 to expose a part of the door 24. The cover 20 is disposed on the base 18 and connected to the first body 12 by a plurality of pivoting components 26. Thus, the second body 14 can rotate relative to the first body 12 at the first direction D1 via a combination of the cover 20 and the pivoting component 26, and further can rotate relative to the base 18 and the first body 12 at the second direction D2 via the pivoting mechanism 22. The electronic device 10 of the present invention can be easily switched between the notebook computer mode and the tablet computer mode.

Figure 3:
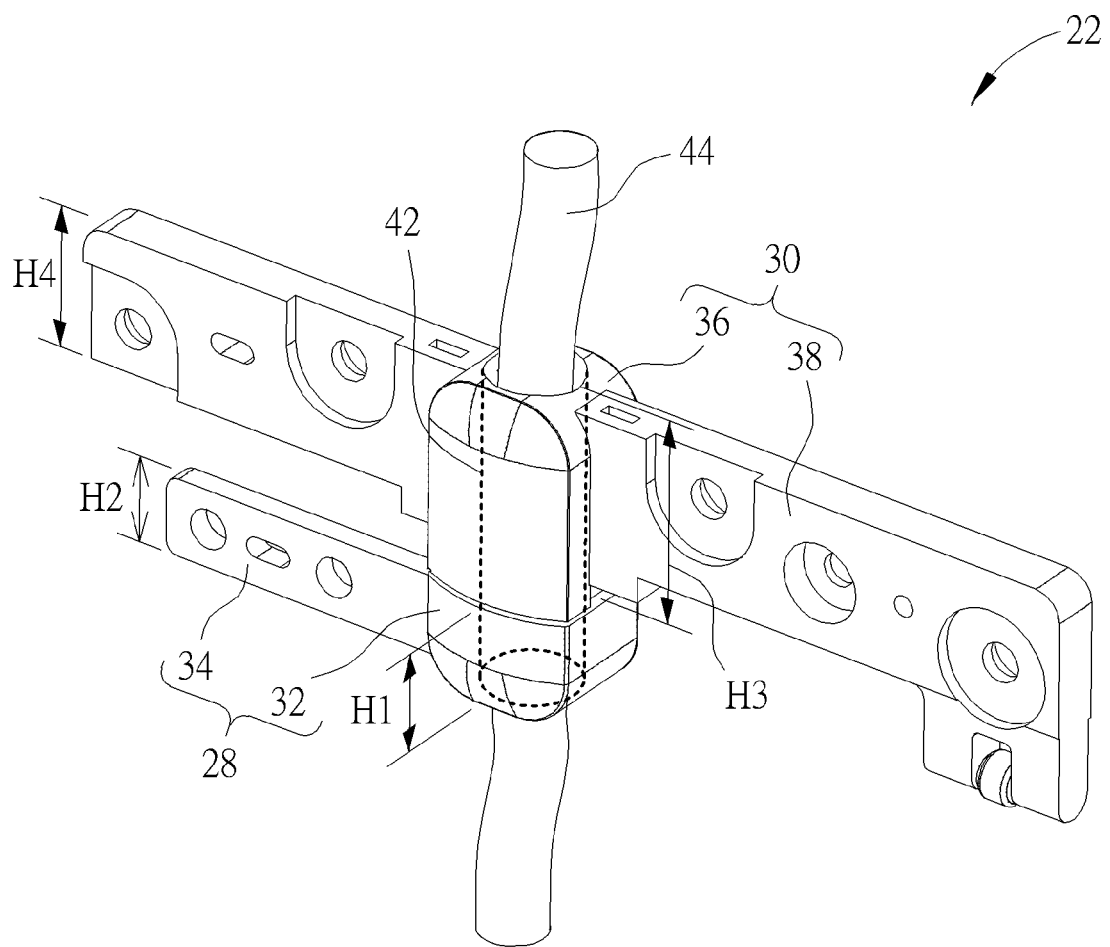
FIG. 3 is a diagram of a pivoting mechanism according to the embodiment of the present invention.

Please refer to FIG. 1 to FIG. 3. FIG. 3 is a diagram of the pivoting mechanism 22 according to the embodiment of the present invention. The pivoting mechanism 22 includes a first driving component 28 and a second driving component 30. The first driving component 28 is disposed between the base 18 and the cover 20. The second driving component 30 is disposed on the second body 14. The first driving component 28 includes a first pivoting portion 32 and a first connecting portion 34. The first connecting portion 34 is disposed on an end of a lateral surface of the first pivoting portion 32 spaced from the second driving component 30. The second driving component 30 includes a second pivoting portion 36 and a second connecting portion 38. The second connecting portion 38 is disposed on an end of a lateral surface of the second pivoting portion 36 spaced from the first driving component 28. The first connecting portion 34 and the second connecting portion 38 are respectively fixed on the base 18 and the second body 14 by a plurality of fixing components 40.

As shown in FIG. 3, the pivoting mechanism 22 further includes a pivot shaft 42 disposed between the first pivoting portion 32 and the second pivoting portion 36. The second driving component 30 can rotate relative to the first driving component 28 via the pivot shaft 42. The pivot shaft 42 can be a hollow structure wherethrough a transmission cable 44 of the electronic device 10 passes. Two ends of the transmission cable 44 are electrically connected to electronic components respectively disposed on the first body 12 and the second body 14, and an electric signal of the host can be transmitted to the screen to display an image. A height H1 of the first pivoting portion 32 can be substantially greater than a height H2 of the first connecting portion 34, a height H3 of the second pivoting portion 36 can be substantially greater than a height H4 of the second connecting portion 38. A gap can be formed between the first connecting portion 34 and the second connecting portion 38 to provide rotary tolerance of the second body 14 relative to the first body 12.

Figure 4:
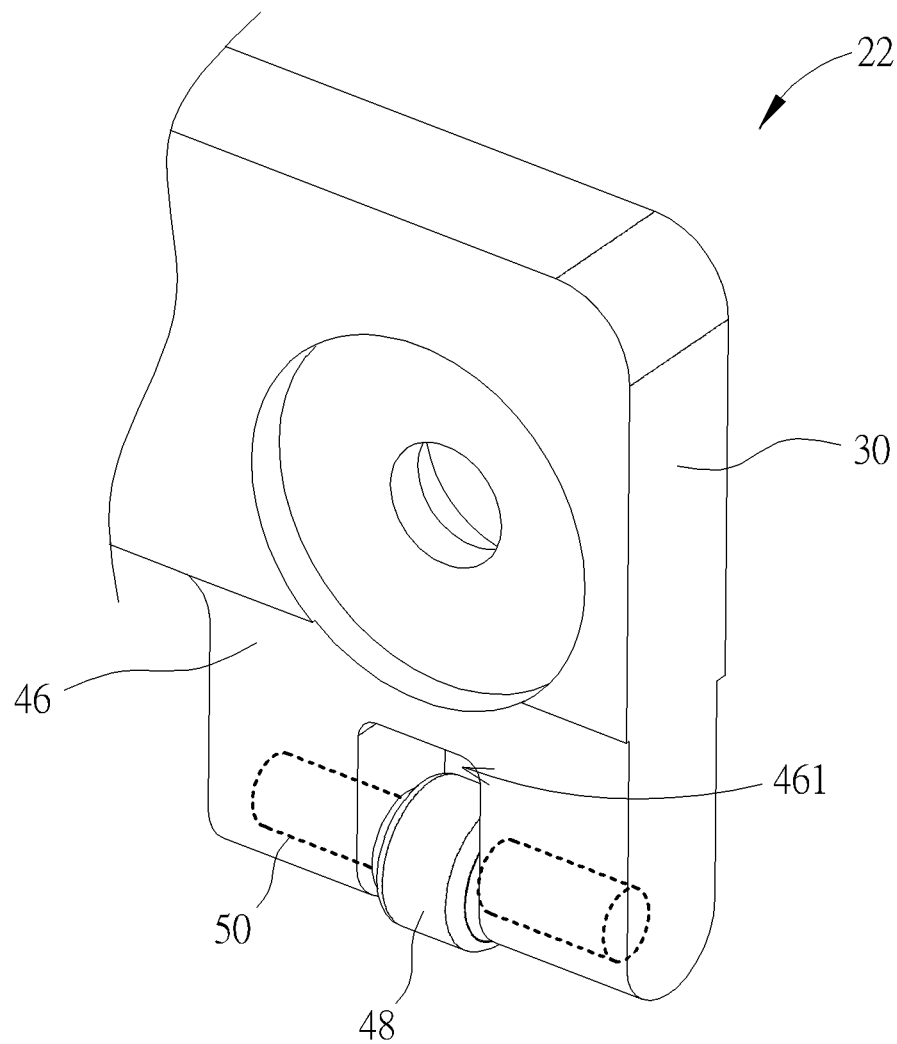
FIG. 4 is a partly enlarged diagram of the pivoting mechanism according to the embodiment of the present invention.

Please refer to FIG. 3 and FIG. 4. FIG. 4 is a partly enlarged diagram of the pivoting mechanism 22 according to the embodiment of the present invention. The second driving component 30 further includes a positioning portion 46, a rotary unit 48 and a rotary shaft 50. The positioning portion 46 is disposed on a position of the second connecting portion 38 different from the second pivoting portion 36, which means the positioning portion 46 is preferably located at an outer end of the second connecting portion 38. A height of the positioning portion 46 can be substantially smaller than the gap between the first connecting portion 34 and the second connecting portion 38, such as an interval between the first driving component 28 and the second driving component 30, to prevent the positioning portion 46 from interference with the first driving component 28 when the pivoting mechanism 22 works. The positioning portion 46 can include a slot structure 461. The rotary unit 48 can be a roller rotatably disposed inside the slot structure 461. The rotary shaft 50 passes through the rotary unit 48, two ends of the rotary shaft 50 respectively pivot to two opposite inner walls of the slot structure 461. Besides, a side of the rotary unit 48 can slightly protrude from the slot structure 461. The rotary unit 48 rolls on a surface of the first body 12 when the second driving component 30 rotates relative to the first driving component 28. The rotary unit 48 can provide a stable supporting force to prevent the second body 14 from shake due to gravity, so as to effectively avoid the second driving component 30 (or the second body 14) from contacting/scraping the first body 12.

Figure 5:
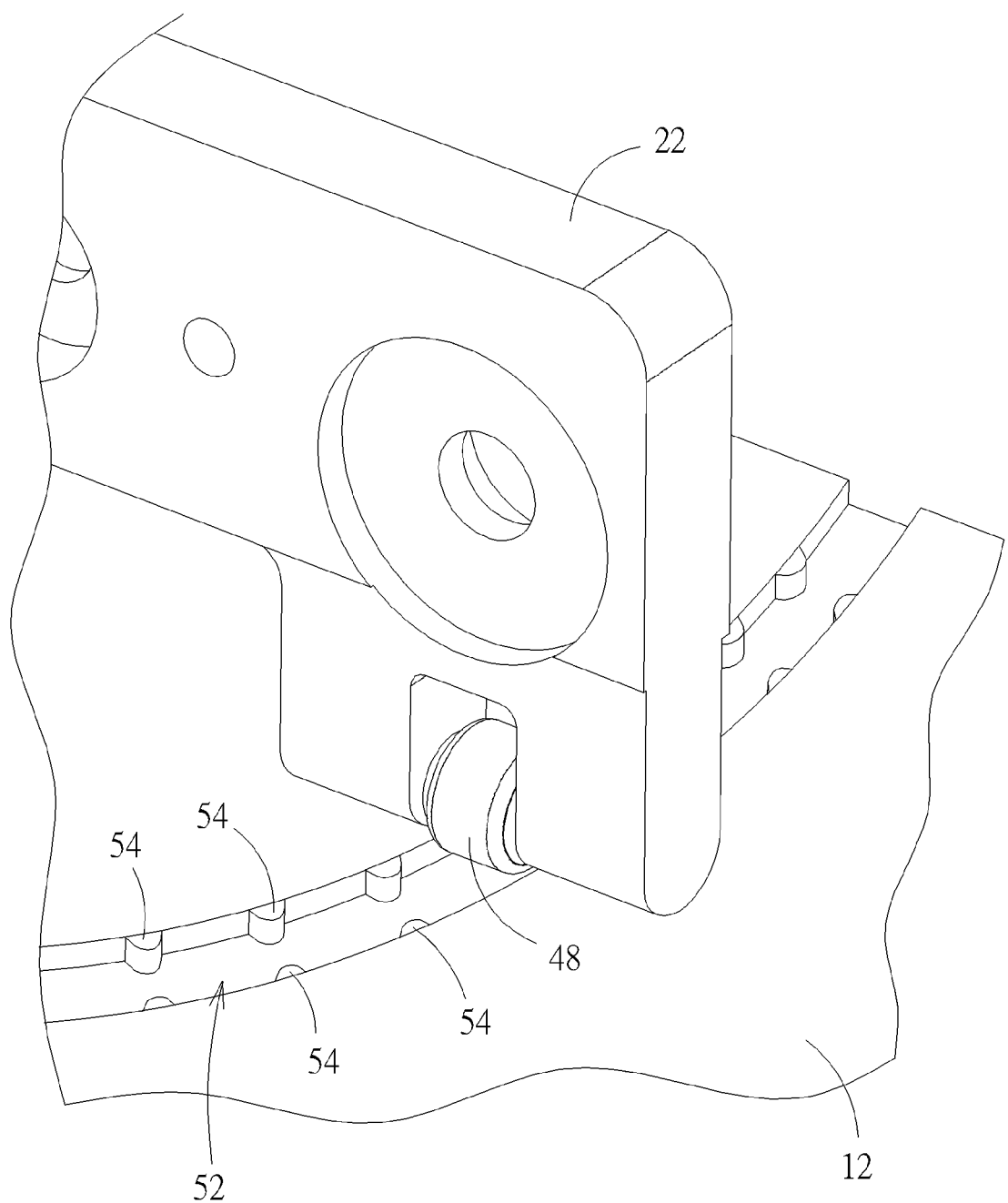
FIG. 5 is a partial diagram of the pivoting mechanism and a first body shown in FIG. 4.

Please refer to FIG. 5. FIG. 5 is a partial diagram of the pivoting mechanism 22 and the first body 12 shown in FIG. 4. The second body 12 can further include a positioning structure 52, and a plurality of constraining structures 54 can be disposed on an inner lateral wall of the positioning structure 52. The positioning structure 52 can be a sunken shape, and the constraining structure 54 can be a protrusion formed inside the sunken shape. A structural direction of the positioning structure 52 and an arrangement of the constraining structures 54 substantially correspond to a movement track of the rotary unit 48. The rotary unit 48 moves inside the positioning structure 52 when the second body 14 rotates relative to the first body 12 via the pivoting mechanism 22. The constraining structures 54 contact against sides of the rotary unit 48 for guiding the rotary unit 48 to move along the correct track. Further, the separated arrangement of the constraining structures 54 can provide operation feel to move the rotary unit 48 step by step, so as to prompt a rotary angle of the second body 14 relative to the first body 12.

Figure 6:
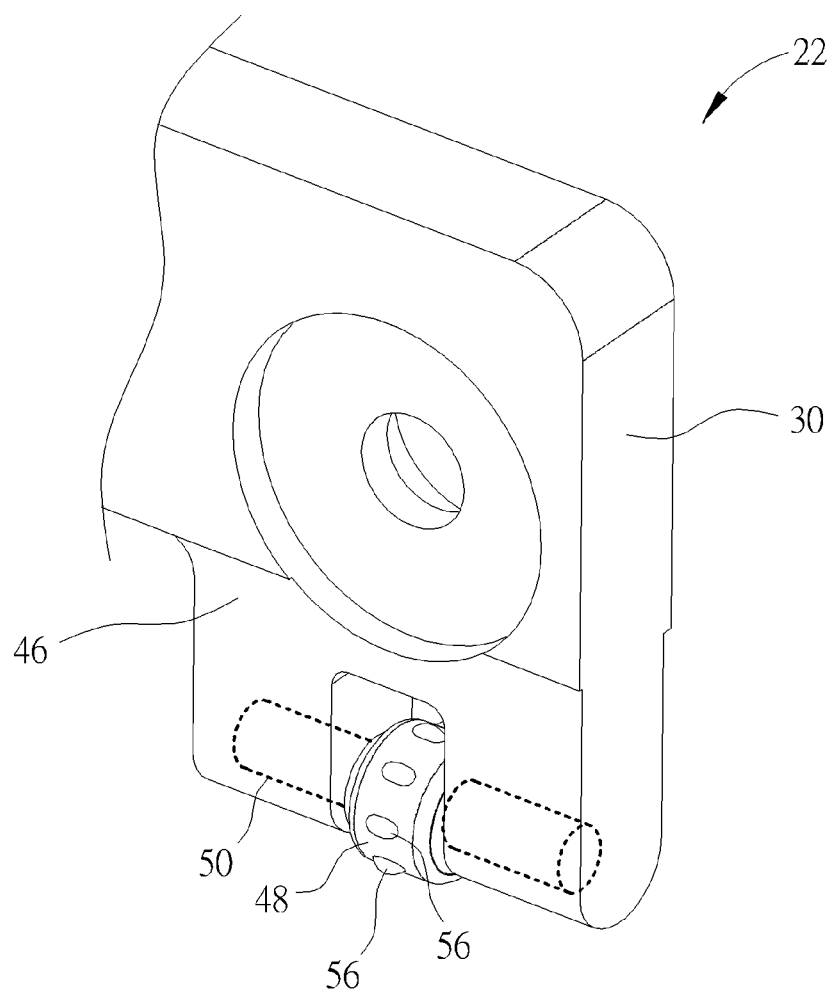
FIG. 6 is a partly enlarged diagram of the pivoting mechanism according to the other embodiment of the present invention.

Please refer to FIG. 6. FIG. 6 is a partly enlarged diagram of the pivoting mechanism 22 according to the other embodiment of the present invention. The second driving component 30 of the pivoting mechanism 22 further can include at least one positioning unit 56 disposed on an outer surface of the rotary unit 48 to guide the rotary unit 48 to move. For example, the positioning unit 56 is preferably made of rubber material for resilience and viscidity. When the second body 14 rotates relative to the first body 12, resilient deformation of the positioning unit 56 can be utilized to absorb the shake of the second body 14 for preventing vibration. The viscidity of the positioning unit 56 can prevent the movement track of the rotary unit 48 from shift. It should be mentioned that the second driving component 30 can selectively includes a plurality of small-size positioning units 56, which is as protrusion form, separately disposed on the outer surface of the rotary unit 48. Further, the second driving component 30 can selectively include a long-strap positioning unit 56 annularly disposed on the outer surface of the rotary unit 48. Application of the positioning unit 56 is not limited to the above-mentioned embodiments, and depends on design demand.

Figure 7:
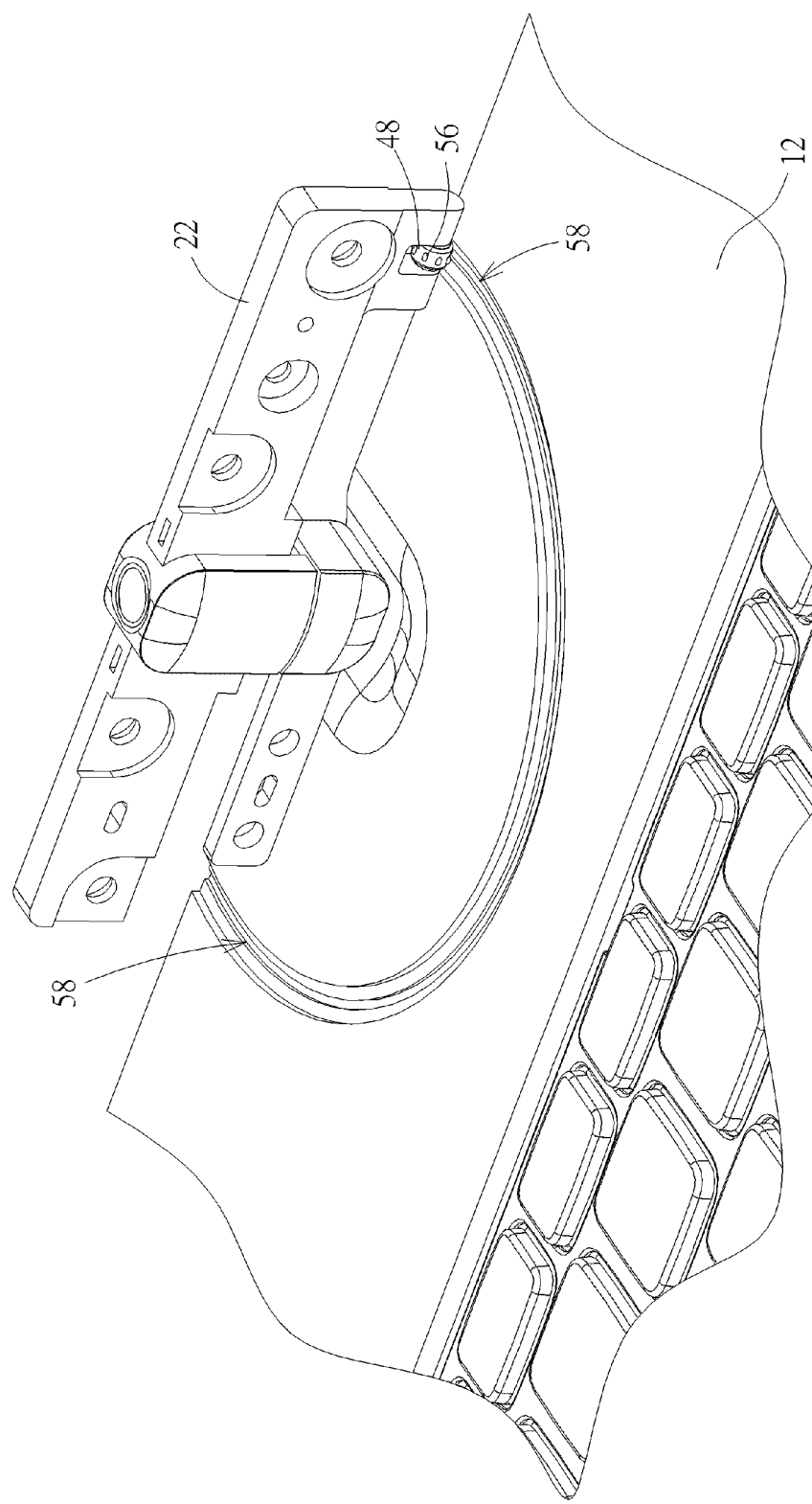
FIG. 7 is a partial diagram of the pivoting mechanism and the first body shown in FIG. 6.

Please refer to FIG. 7. FIG. 7 is a partial diagram of the pivoting mechanism 22 and the first body 12 shown in FIG. 6. The first body 12 further can includes a constraint slot 58. A structural direction of the constraint slot 58 corresponds to the movement track of the rotary unit 48. The positioning unit 56 can be movably engaged inside the constraint slot 58 when the second body 14 rotates relative to the first body 12, to guide the rotary unit 48 to move along the correct track. In the present invention, the rotary unit 48 and the positioning unit 56 not only can be the shapes of the roller and the protrusion as mentioned above, but also can be the spheroid such like a ball. Related application of the rotary unit and the positioning unit depends on actual demand. Furthermore, the pivot module 16 of the present invention can selectively include a plurality of gaskets 60 disposed on the second body 14 and the cover 20 respectively. As shown in FIG. 2, the gasket 60 can be the component for abrasion proof and decoration.

In conclusion, the pivoting mechanism and the related pivot module of the present invention provide the multiple rotating functions. The second body can rotate relative to the first body via the pivot module to switch the electronic device into the notebook computer mode or the tablet computer mode. The pivoting mechanism of the present invention has advantages of simple structure, low amount of the components and cheap manufacturing cost. The rotary unit of the pivoting mechanism rolls over the surface of the first body when the second body rotates relative to the first body. A weight of the second body is shared by the pivot shaft and the rotary unit to effectively prevent the second body (or the second driving component) from scraping the first body due to insufficient strength in rotation. Besides, the pivoting mechanism and the related pivot module can be separated from the first body and the second body. Dimensions and shape of the pivoting mechanism can be designed according to aesthetic demand, not for industry design constraint of the main body. The pivoting mechanism and the related pivot module of the present invention can be suitable for the thin-typed electronic device.

Comparing to the prior art, the present invention disposes the rotary unit on the pivoting mechanism, the rotary unit movably contacts against the body when the operation mode of the electronic device is switched, so as to provide the stable supporting force and prevent the bodies from collision during the rotation. Therefore, the present invention provides the pivoting mechanism with simple structure and preferable aesthetic appearance, which conforms to demand of the thin-typed electronic device in the consumer market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pivoting mechanism comprising:
   a first driving component, the first driving component comprising:
      a first pivoting portion; and
      a first connecting portion disposed on the first pivoting portion;
   a second driving component, the second driving component comprising:
      a second pivoting portion;
      a second connecting portion, an end of the second connecting portion being disposed on the second pivoting portion;
      a positioning portion disposed on the other end of the second connecting portion different from the end of the second connecting portion where the second pivoting portion is disposed, the positioning portion comprising a slot structure;
      a rotary unit disposed inside the slot structure; and
      a rotary shaft passing through the rotary unit, two ends of the rotary shaft respectively pivoting to two opposite inner walls of the slot structure; and
   a pivot shaft disposed between the first pivoting portion and the second pivoting portion.

2. The pivoting mechanism of claim 1, wherein a side of the rotary unit protrudes from the slot structure.

3. The pivoting mechanism of claim 1, wherein a height of the first pivoting portion is substantially greater than a height of the first connecting portion, and the first connecting portion is disposed on an end of a lateral surface of the first pivoting portion spaced from the second driving component.

4. The pivoting mechanism of claim 1, wherein a height of the second pivoting portion is substantially greater than a height of the second connecting portion, and the second connecting portion is disposed on an end of a lateral surface of the second pivoting portion spaced from the first driving component.

5. The pivoting mechanism of claim 1, wherein a height of the positioning portion is substantially smaller than a distance between the first driving component and the second driving component.

6. The pivoting mechanism of claim 1, wherein the pivot shaft is a hollow structure for being passed through by a transmission cable.

7. The pivoting mechanism of claim 1, wherein the second driving component further comprises:
   a positioning unit disposed on an outer surface of the rotary unit to guide the rotary unit to move.

8. An electronic device comprising:
   a first body;
   a second body rotatably disposed on the first body; and
   a pivot module disposed between the first body and the second body, the pivot module comprising:

a base;

a cover disposed on the base and pivoting to the first body; and a pivoting mechanism disposed between the base and the second body, the pivoting mechanism comprising:

a first driving component disposed between the base and the cover, the first driving component comprising:

a first pivoting portion; and a first connecting portion disposed on the first pivoting portion;

a second driving component disposed on the second body, the second driving component comprising:

a second pivoting portion;

a second connecting portion, an end of the second connecting portion being disposed on the second pivoting portion;

a positioning portion disposed on the other end of the second connecting portion different from the end of the second connecting portion where the second pivoting portion is disposed, the positioning portion comprising a slot structure;

a rotary unit disposed inside the slot structure; and a rotary shaft passing through the rotary unit, two ends of the rotary shaft respectively pivoting to two opposite inner walls of the slot structure; and a pivot shaft disposed between the first pivoting portion and the second pivoting portion.

9. The electronic device of claim 8, wherein a side of the rotary unit protrudes from the slot structure.

10. The electronic device of claim 8, wherein a height of the first pivoting portion is substantially greater than a height of the first connecting portion, and the first connecting portion is disposed on an end of a lateral surface of the first pivoting portion spaced from the second driving component.

11. The electronic device of claim 8, wherein a height of the second pivoting portion is substantially greater than a height of the second connecting portion, and the second connecting portion is disposed on an end of a lateral surface of the second pivoting portion spaced from the first driving component.

12. The electronic device of claim 8, wherein a height of the positioning portion is substantially smaller than a distance between the first driving component and the second driving component.

13. The electronic device of claim 8, wherein the electronic device further comprises a transmission cable, the pivot shaft is a hollow structure, the transmission cable passes through the hollow structure to electrically connect to the first body and the second body, respectively.

14. The electronic device of claim 8, wherein the second driving component further comprises:

at least one positioning unit disposed on an outer surface of the rotary unit to guide the rotary unit to move.

15. The electronic device of claim 14, wherein the first body comprises a constraint slot for accommodating the positioning unit, a structural direction of the constraint slot corresponds to a movement track of the rotary unit.

16. The electronic device of claim 8, wherein the first body comprises a positioning structure, a plurality of constraining structures is disposed on an inner lateral wall of the positioning structure for contacting against the rotary unit, an arrangement of the plurality of constraining structures corresponds to a movement track of the rotary unit.

17. The electronic device of claim 16, wherein the constraining structure is a protrusion.

18. The electronic device of claim 8, wherein the first connecting portion and the second connecting portion are respectively fixed on the base and the second body by a plurality of fixing components.

19. The electronic device of claim 8, wherein the pivot module further comprises:

a door disposed on the base and located by a side of the pivoting mechanism.

20. The electronic device of claim 8, wherein the second body rotates relative to the first body in a first direction via the cover, the second body further rotates relative to the base in a second direction different from the first direction via the pivoting mechanism.

* * * * *